(12) United States Patent
Yan

(10) Patent No.: US 10,850,891 B2
(45) Date of Patent: Dec. 1, 2020

(54) FULL RECYCLING ENVIRONMENTAL PROTECTION PACKAGING STRUCTURE AND MANUFACTURING METHOD THEREOF

(71) Applicant: BETA (SHENZHEN) PACKAGE PRODUCTS CO., LTD, Shenzhen (CN)

(72) Inventor: Jinwei Yan, Shenzhen (CN)

(73) Assignee: BETA (SHENZHEN) PACKAGE PRODUCTS CO., LTD, Shenzhen (CN)

( * ) Notice: Subject to any disclaimer, the term of this patent is extended or adjusted under 35 U.S.C. 154(b) by 0 days.

(21) Appl. No.: 16/795,554

(22) Filed: Feb. 19, 2020

(65) Prior Publication Data

US 2020/0307866 A1  Oct. 1, 2020

(30) Foreign Application Priority Data

Mar. 29, 2019 (CN) .................. 2019 1 02528560
Mar. 29, 2019 (CN) .................. 2019 2 04193567 U
Aug. 8, 2019 (CN) .................. 2019 1 07316347

(51) Int. Cl.
*B65D 30/08* (2006.01)
*B31B 70/02* (2017.01)
(Continued)

(52) U.S. Cl.
CPC ............ *B65D 31/02* (2013.01); *B31B 70/005* (2017.08); *B31B 70/024* (2017.08); *B31B 70/20* (2017.08);
(Continued)

(58) Field of Classification Search
CPC ...... B65D 31/02; B65D 65/406; B65D 65/44; B65D 65/466; B65D 81/03; B32B 1/00; B32B 3/266; B32B 29/005; B32B 2439/06
(Continued)

(56) References Cited

U.S. PATENT DOCUMENTS 1,902,361 A * 3/1933 Hamersley ............. B65D 65/44
428/101
3,055,575 A * 9/1962 Gerard ................... B65D 75/68
383/206
(Continued)

FOREIGN PATENT DOCUMENTS

CN   102733266 A   10/2012
CN   205062572 U   3/2016
(Continued)

OTHER PUBLICATIONS

Machine translation of JP-2017193373-A.*

*Primary Examiner* — Jes F Pascua

(57) ABSTRACT

A full recycling environmental protection packaging structure and a manufacturing method thereof applied to express deliveries, postal services and logistics and made of a planar structure of paper. The packaging structure includes a first surface and a protecting layer overlapped on the first surface. The protecting layer includes at least one layer of liner which is a three-dimensional network structure formed by paper material being stretched after being die-cut. The planar structure is sealed edges thereof and an opening is reserved to form a bag body. The packaging structure of the present disclosure can overcome problems that kraft paper bubble bags or envelopes, and paper and plastics can't be separated and recycled to pollute environment in the prior art. At the same time, it can solve technical problems of dust (Continued)

pollution and poor air quality caused by using powdery and granular soft structures used as buffers.

14 Claims, 10 Drawing Sheets

(51) Int. Cl.
| | | |
|---|---|---|
| B31B 70/26 | (2017.01) | |
| B31B 70/00 | (2017.01) | |
| B31B 70/20 | (2017.01) | |
| B31B 70/62 | (2017.01) | |
| B32B 1/00 | (2006.01) | |
| B32B 3/26 | (2006.01) | |
| B32B 29/00 | (2006.01) | |
| B65D 65/40 | (2006.01) | |
| B65D 81/02 | (2006.01) | |
| B65D 65/46 | (2006.01) | |
| B65D 81/03 | (2006.01) | |

(52) U.S. Cl.
CPC ............ *B31B 70/26* (2017.08); *B31B 70/62* (2017.08); *B32B 1/00* (2013.01); *B32B 3/266* (2013.01); *B32B 29/005* (2013.01); *B65D 65/406* (2013.01); *B65D 65/44* (2013.01); *B65D 65/466* (2013.01); *B65D 81/03* (2013.01); *B32B 2439/06* (2013.01)

(58) Field of Classification Search
USPC .............................................. 383/1
See application file for complete search history.

(56) References Cited

U.S. PATENT DOCUMENTS

| | | | | |
|---|---|---|---|---|
| 3,779,850 | A | * 12/1973 | Gerard | ............. B31F 1/07 156/199 |
| 5,544,473 | A | * 8/1996 | Maida | ............. B65D 31/04 206/591 |
| 5,688,578 | A | * 11/1997 | Goodrich | ............. B31D 3/002 428/136 |
| 2005/0048258 | A1* | 3/2005 | Kuchar | ............. D04D 9/00 428/131 |
| 2017/0107017 | A1* | 4/2017 | Kuchar | ............. B65D 65/38 |
| 2020/0039720 | A1* | 2/2020 | Goodrich | ............. B65D 81/022 |

FOREIGN PATENT DOCUMENTS

| | | | |
|---|---|---|---|
| JP | 2017193373 A | * | 10/2017 |
| WO | 96/01731 | | 1/1996 |

* cited by examiner

FULL RECYCLING ENVIRONMENTAL PROTECTION PACKAGING STRUCTURE AND MANUFACTURING METHOD THEREOF

BACKGROUND

1. Technical Field

The present disclosure generally relates to packages field applied to express deliveries, postal services and logistics fields, and specifically relates to a full recycling environmental protection packaging structure and a manufacturing method thereof entirely manufactured by environmental-friendly materials.

2. Description of Related Art

Referring to FIG. 1, in fields of packages in logistics, express deliveries and postal services, especially packaging structures with buffer structures, the buffer structure A is generally used by a plastic board or a plastic foam A1, while, the plastic board and the plastic foam A1 can't be directly adhered to an inner wall of a paper packaging structure. The inner wall of the paper packaging structure is first covered with a thermoplastic plastic film B by a thermoplastics way, and then the plastic board and the plastic foam A1 can be adhered to the thermoplastic plastic film B. The plastic board and the plastic foam A1 are first needed to be tore off and the plastic film B is needed to be separated from the inner wall during recycling and reusing the paper packaging structure. However, the plastic film B is very thin so that it is difficult to be separated from the inner wall, thereby it can't be recycled. For example, a kraft paper bubble bag, with a kraft paper bag body, is commonly used in the current market, the plastic film B is formed on a side of the kraft paper and the plastic foam A1 is set on the plastic film B to be used as buffer material A. Both the plastic film B and the plastic foam A1 can't be separated from each other, thereby the kraft paper bubble bag can't be recycled and naturally degraded resulting in polluting the environment.

Referring to FIG. 2, in other cases, the buffer material is also used to grind and cut other recoverable materials to form a powdery, granular soft structure C, when the packaging structure is produced, such powdered and granular materials are filled as buffers. However, such production process and technology will lead to a production environment where the powder in air seriously exceeds a standard, and a high requirement of manufacturing devices is needed to result in potential harm for the health of workers.

SUMMARY

The technical problems to be solved: in view of the shortcomings of the related art, the present disclosure relates to a full recycling environmental protection packaging structure and a manufacturing method thereof which can solve technical problems that buffer material can't be recycled, environmental pollution and poor working environment.

The technical solution adopted for solving technical problems of the present disclosure is:

a full recycling environmental protection packaging structure applied to express deliveries, postal services and logistics and made of a planar structure of paper, the planar structure includes:

a first surface and a protecting layer overlapped on the first surface;

the protecting layer including at least one layer of liner which is a three-dimensional network structure formed by paper material being stretched after the paper material is die-cut;

the liner is formed by stretching a die-cutting paper, and a plurality rows of die-cutting lines is formed by die-cutting the die-cutting paper; each row of die-cutting lines includes a plurality of die-cutting knife lines arranged thereon at intervals after the each row of die-cutting lines is die-cut, so that a die-incision is formed by stretching the die-cutting knife line;

the packaging structure is sealed by the planar structure and an opening is reserved to form a bag body.

The protecting layer of the full recycling environmental protection packaging structure of the present disclosure can play as a protective buffering role and includes at least one layer of liner with a network structure being stretched after die-cutting it to as a buffer. The whole planar structure is made of paper material, which can overcome the problem of needing to be separated during recycling it in the prior art.

Then, the material of the die-cutting paper and the first surface are paper material so that they can be simply in stock to mix them; when the die-cutting paper is formed by die-cutting the paper material, the die-cutting paper can also be separated with winding paper with coiled material so that it is only needed to unreel and stretch the die-cutting paper in production the planar structure so as to reduce storage costs of the die-cutting paper material as the greatest as possible.

Furthermore, the protecting layer is used by the liner, and the liner is formed by stretching the die-cutting paper after die-cutting it, so, comparing with filling powders, particles, etc., it has less environmental pollution and can reduce potential harm to the health of workers.

At the same time, a manufacturing method of the above fill recycling environmental protection packaging structure is provided and includes:

step S1, preparing at least two rolls of base paper rolls; step S2, selecting at least one roll of base paper roll, performing unreeling processing on the at least one roll of base paper roll to form a die-cutting paper, and rewinding the die-cutting paper to be reserved; step S3, selecting at least one roll of base paper roll and at least one roll of die-cutting paper roll and then synthetically unreeling the at least one roll of base paper roll and the at least one roll of die-cutting paper roll along a same direction, stretching a die-cutting paper coiled material to form a liner belt, and then adhering the liner belt and an unreeled base paper reel belt to form a planar structure belt; step S4, sealing the planar structure on edges thereof and reserving an opening to form a bag body.

In the manufacturing method of the present disclosure, both the liner belt and the base paper are made of paper material, which isn't needed to be separated during being recycled. In this way, the present disclosure can overcome problems that buffer material can't be separated and recycled to pollute environment in the prior art. At the same time, the liner belt of the present disclosure is used as a buffer to solve technical problems of dust pollution and poor air quality caused by using powdery and granular soft structures used as buffer materials. Furthermore, the liner belt used as the buffer also can achieve a same buffer effect of a conventional plastic board or a conventional plastic foam played as buffer materials, so as to prevent internal articles received in the packaging structure from being damaged. In addition, during manufacturing the packaging structure of the present disclosure, a whole raw material production, including the production of the liner belt, is completed in a process of delivering the paper roll. In this way, in the process of stretching, laminating and die-cutting, conveyor belts have been in a state of delivery, thereby a higher production efficiency can be obtained.

DETAILED DESCRIPTION

Figure 1:
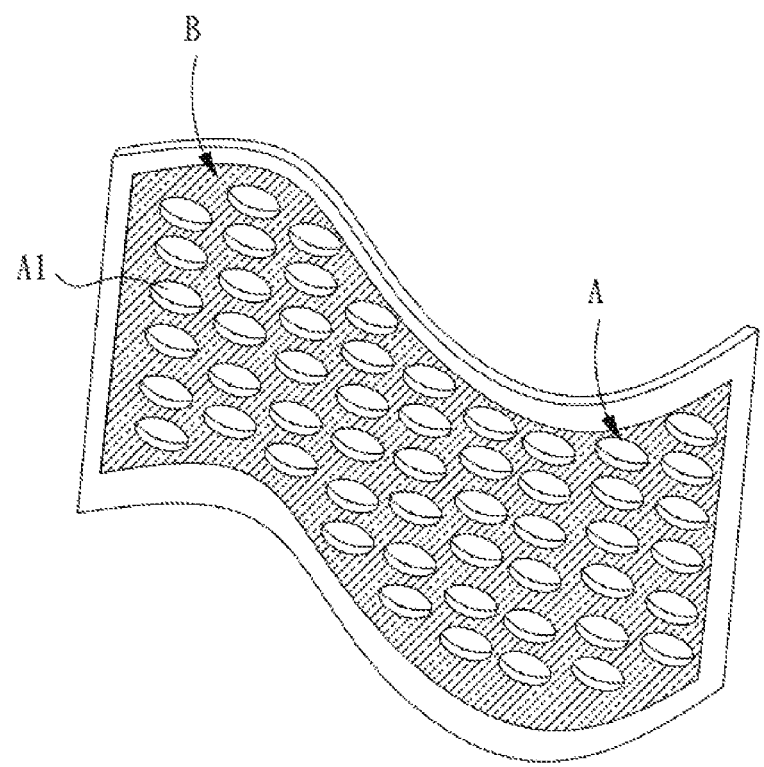
FIG. 1 & FIG. 2 are schematic views of two conventional packaging structures described in the related art.
Figure 2:
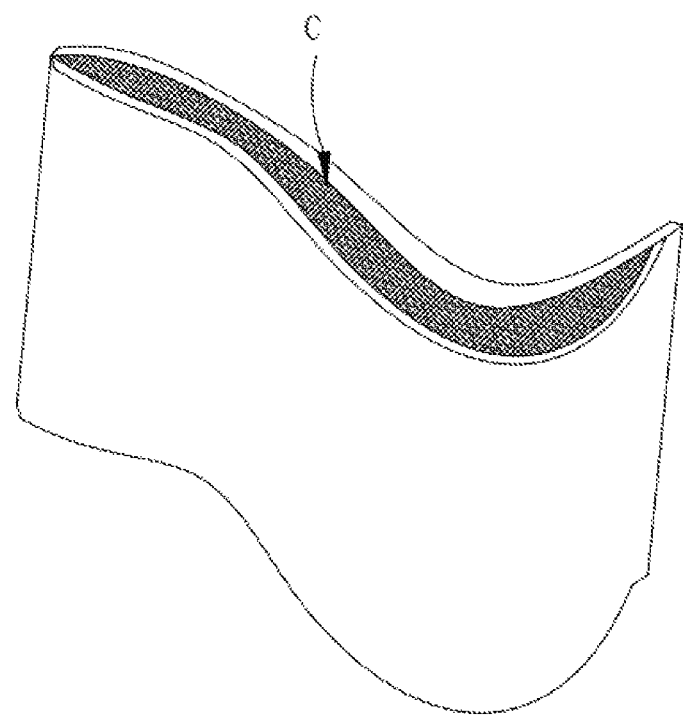

The disclosure is illustrated by way of example and not by way of limitation in the figures of the accompanying drawings, in which like reference numerals indicate similar elements.

Figure 3:
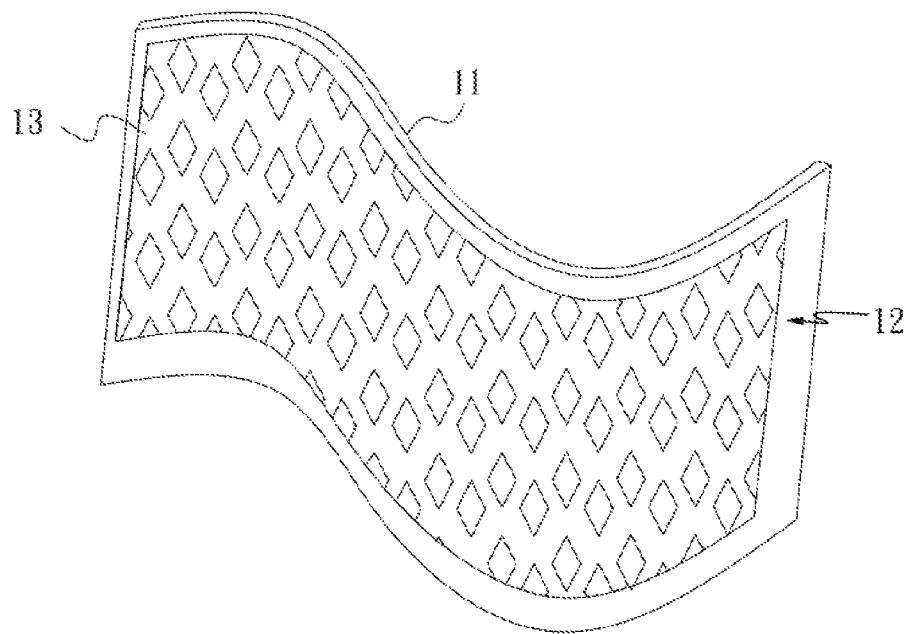
FIG. 3 is a schematic view of a planar structure of a full recycling environmental protection packaging structure in accordance with an embodiment of the present disclosure.

Referring to FIG. 3, a full recycling environmental protection packaging structure 100 (labeled in FIG. 15) according to an embodiment of the present disclosure is applied to express deliveries, postal services and logistics and made of a planar structure 10 (labeled in FIG. 8) of paper. The planar structure 10 includes a first surface 11 and a protecting layer 12 overlapped on the first surface 11. The first surface 1 is provided for supporting the protecting layer 12 and the protecting layer 12 is provided for acting as shock absorption protection. The planar structure 10 formed by the first surface 11 and the protecting layer 12 can wrap around goods and the outer of expresses so as to prevent express and postal parcels from being damaged.

Figure 4:
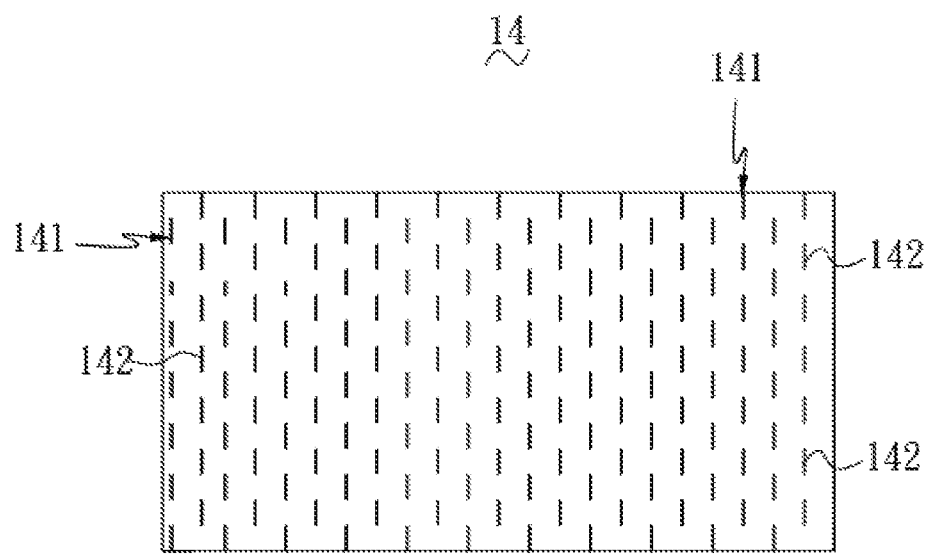
FIG. 4 is a schematic view of a die-cutting paper of a full recycling environmental protection packaging structure of the present disclosure.

Referring to FIG. 4, specifically, the protecting layer 12 includes a layer of liner 13 which is a network structure formed by a die-cutting paper 14 being stretched after die-cutting it.

In an embodiment of the present disclosure, the die-cutting paper 14 is made of material same as that of the first surface 11, at this time, it can be more convenient and fast to prepare material in order to manufacture the packaging structure 100. The paper material of the first surface 11 and the paper material of the die-cutting paper 14 can be mixed together to reduce the cost of material preparation. Of course, different paper materials can also be used in other embodiments, depending on actual needs and characteristics of packages and express items, for example, the first surface 11 is made of stronger kraft paper, while, the die-cutting paper 14 is made of ordinary writing paper.

Furthermore, a plurality rows of die-cutting lines 141 is formed by die-cutting the die-cutting paper 14, and each row of die-cutting lines 141 includes a plurality of die-cutting knife lines 142 arranged thereon at interval after the each row of die-cutting s 141 is die-cut. More than one row of die-cutting lines 141 parallel to each other is formed by die-cutting a same die-cutting paper 14, and a distance between every two adjacent die-cutting lines 141 is same. Such die-cutting way with equal interval, can reduce the difficulty of die-cutting process and the manufacturing cost.

Figure 5:
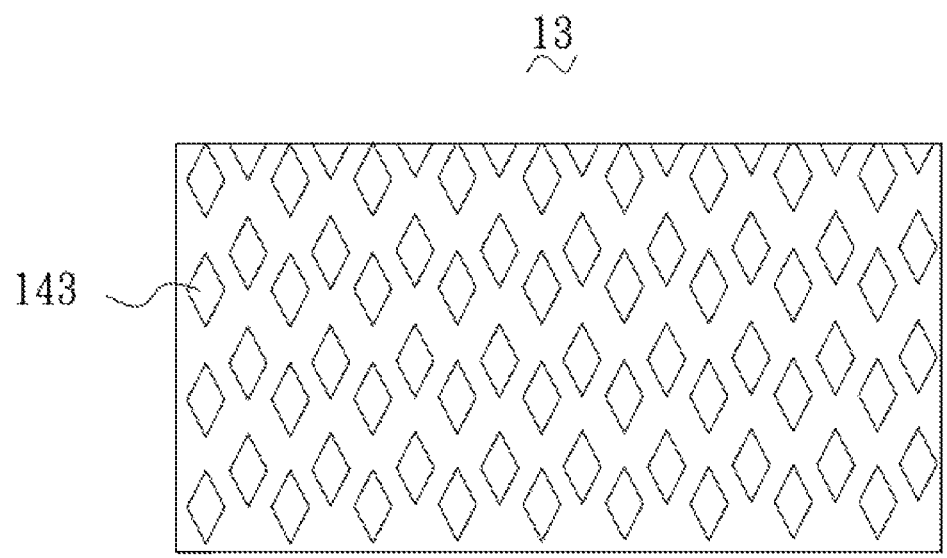
FIG. 5 is a schematic view of a liner formed by the die-cutting paper after stretching the die-cutting paper of the present disclosure.

Referring to FIG. 5, after die-cutting the die-cutting knife line 142 by a die-cutting knife, the die-cutting paper 14 is an indentation formed at a pre-set position of the die-cutting paper 14 or a cutter point for separating the die-cutting paper 14. The die-cutting knife line 142 is intervally arranged on the die-cutting line 141, that is, the die-cutting knife line 142 and a part without die-cutting parts are intervally and alternately arranged thereon. Similar intermittent lines are formed on the die-cutting paper 14 so that the die-cutting knife line 142 is a discontinuous part of the intermittent lines. A die-incision 143 is formed by stretching the die-cutting knife line 142. The die-incision 143 is a diamond-shaped configuration and formed by moving edges of the discontinuous part towards two sides of the die-incision 143. A network structure with multi-rows of diamond openings is formed after stretching the die-cutting paper 14, and is a soft-tissue structure to play as a protective role when it is overlapped on the first surface 11.

Figure 6:
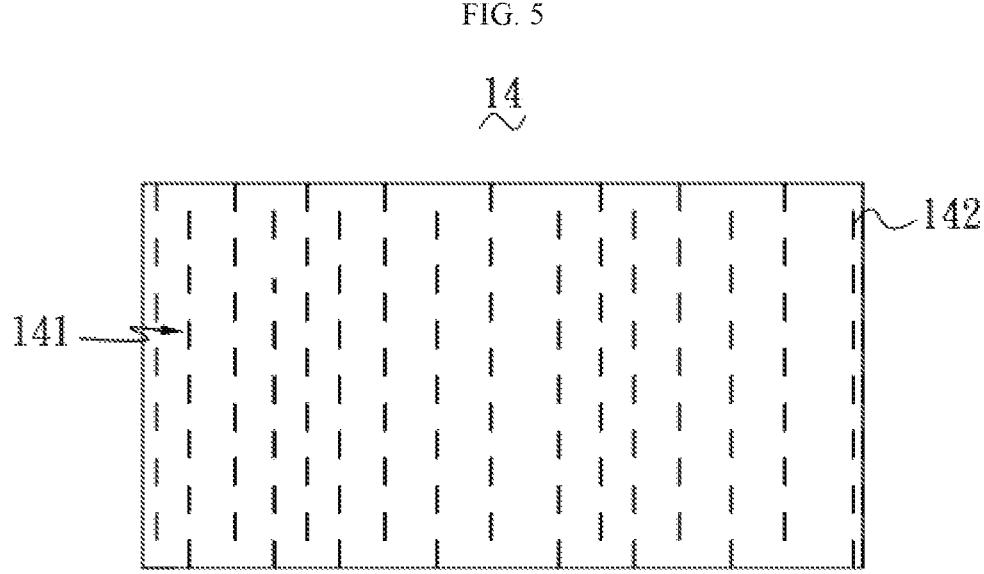
FIG. 6 is a schematic view of another die-cutting paper of a full recycling environmental protection packaging structure of the present disclosure.

Referring to FIG. 6, in another embodiment of the present disclosure, a distance between every two adjacent die-cutting lines 141 can also be different according to different protection strength. For example, when the planar structure 10 is used for wrapping a fragile product such as glass, the fragile product needs to be surrounded by the planar structure 10 again and again. A space between the die-cutting lines 141 of the planar structure 10 surrounding an inner side of the fragile product is less than a space between the die-cutting lines 141 of the planar structure 10 surrounding an outer side of the fragile product, in this way, it can reduce a number of die-cuttings as far as possible and reduce the cost under the conditions without reducing the protection strength premise.

Figure 7:
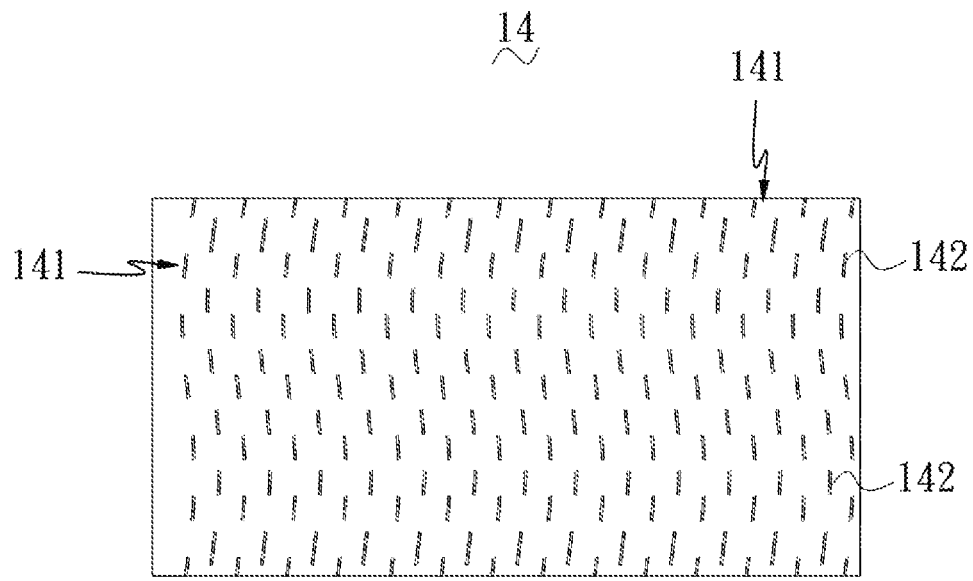
FIG. 7 is a schematic view of another die-cutting paper of a full recycling environmental protection packaging structure of the present disclosure.

Referring to FIG. 7, in other embodiments of the present disclosure, the die-cutting line 141 can be a straight line. In another embodiment of the present disclosure, the die-cutting line 141 can be an arc. No matter a shape of the die-cutting line 141, it is only needed to ensure that the die-cutting lines 141 are parallel to each other and can be stretched to form a network structure.

Figure 8:
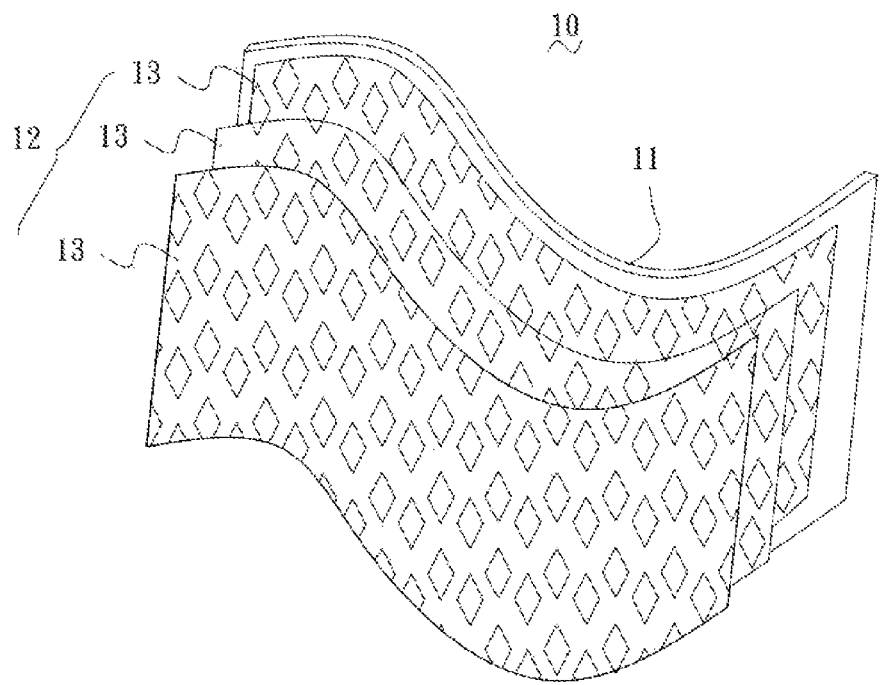
FIG. 8 is a schematic view of a protecting layer with multi-layers of liners of the present disclosure.

Referring to FIG. 8, in other embodiments of the present disclosure, the protecting layer 12 can include multi-layers of liners 13, that is, there are more than two layers of liners 13. At this time, each layer of liners 13 is a network structure formed by stretching the die-cutting paper 14, and the multi-layers of liners 13 are overlapped together to form the protecting layer 12 for further improving the protection strength relative to only one layer of liners 13.

Figure 9:
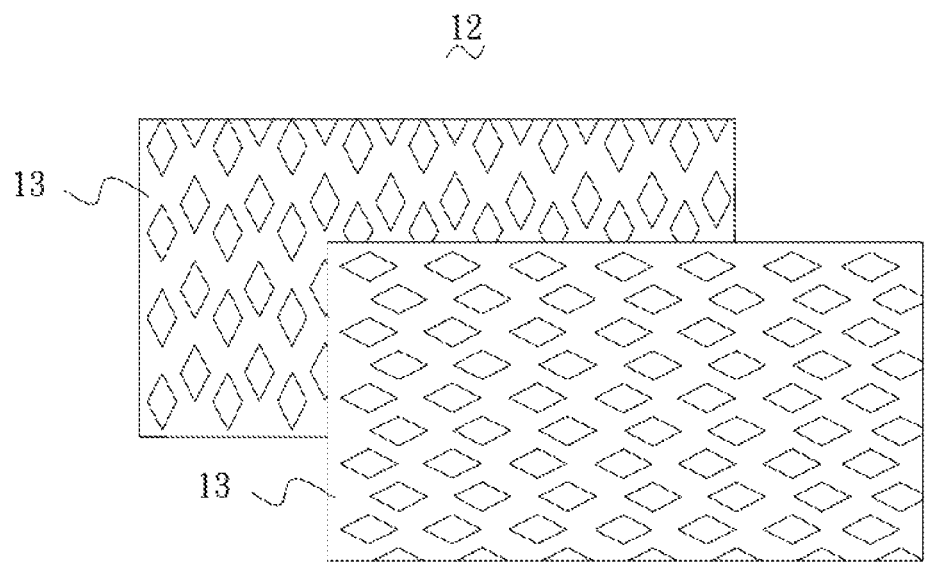
FIG. 9 & FIG. 10 are schematic views of different arrangement ways of the multi-layers of liners of the present disclosure.
Figure 10:
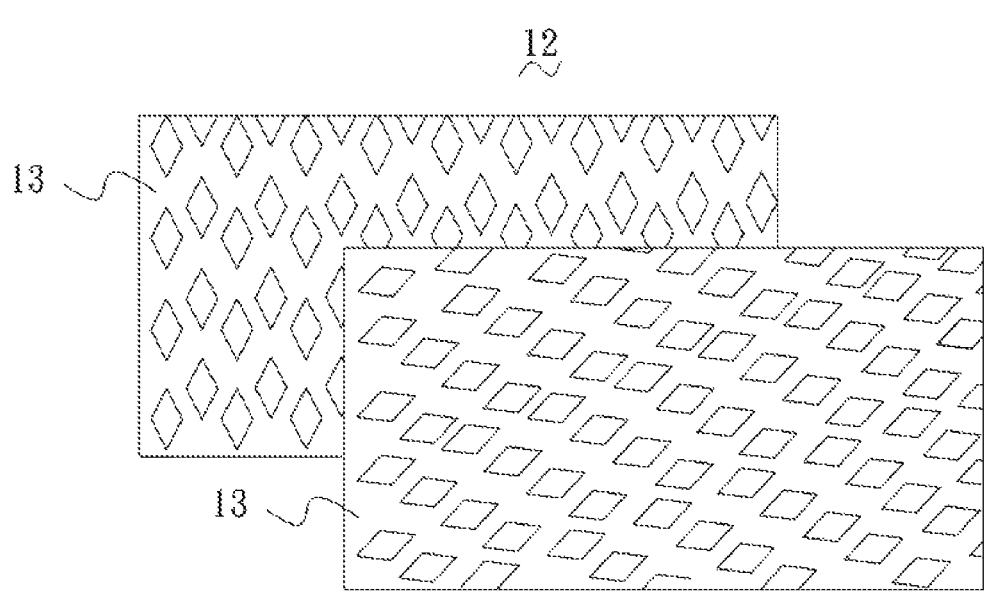

Referring to FIG. 9 and FIG. 10, in an embodiment of the present disclosure, when the protecting layer 12 is formed after overlapping the multi-layers of liners 13 by a variety of overlapping methods. For example, a horizontal and vertical overlapping way, that is, a layout of one row of die-incisions 143 in one layer of liners 13 is perpendicular to a layout of the die-incisions 143 in the other layer of liners 13. A cross overlapping way, that is, an g e is formed between a layout of one row of die-incisions 143 in one layer of liners 13 is perpendicular to a layout of the die-incisions 143 in the other layer of liners 13. A staggered overlapping way, that is, a layout of one row of die-incisions 143 in one layer of liners 13 is located between the other two adjacent rows of die-incisions 143 in the other layer of liners 13. In conclusion, positions of the die-incisions 143 after overlapping the multi-layers of liners 13 can't be completely coincide with each other. The multi-layers of liners 13 without being completely overlapped therebetween are provided for making the protecting layer 12 softer to further improve its protection performance.

Figure 11:
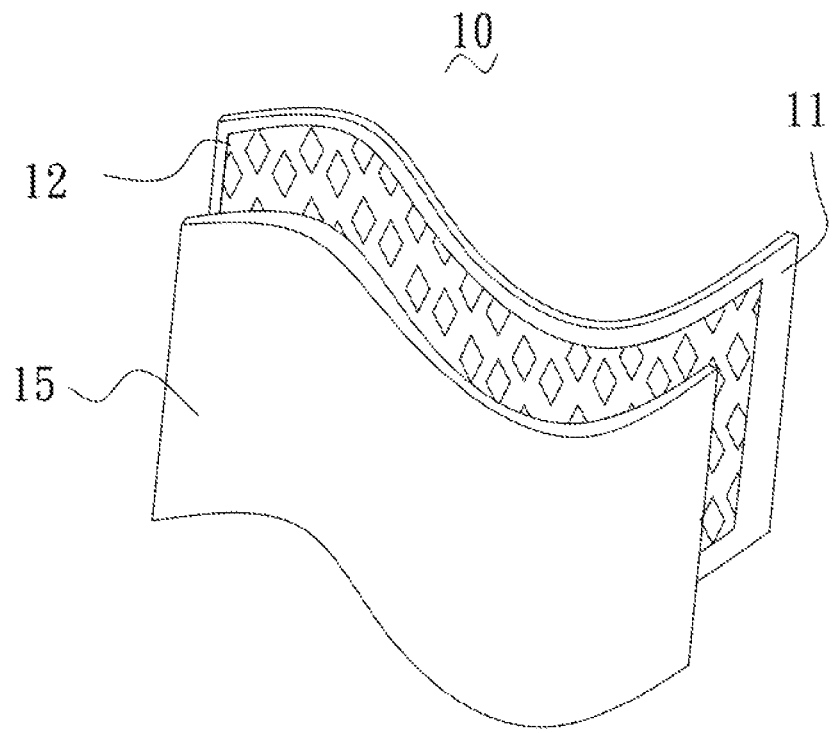
FIG. 11 is a schematic view of a packaging structure formed by the planar structure of the present disclosure.

Referring to FIG. 11, in another embodiment of the present disclosure, the planar structure 10 includes a second surface 15 so that the protecting layer 12 can be clamped between the first surface 11 and the second surface 15.

In an embodiment of the present disclosure, the first surface 11 is made of material same as that of the second surface 15, and the protecting layer 12 is set between the first surface 11 and the second surface 15, thereby the loose protecting e 12 can be prevented from interfering with the packages and express items so as to avoid the protecting layer 12 from falling off during using the planar structure 10. At the same time, it can also increase structural strength of the planar structure 10 and prevent the planar structure 10 from tearing off.

Figure 12:
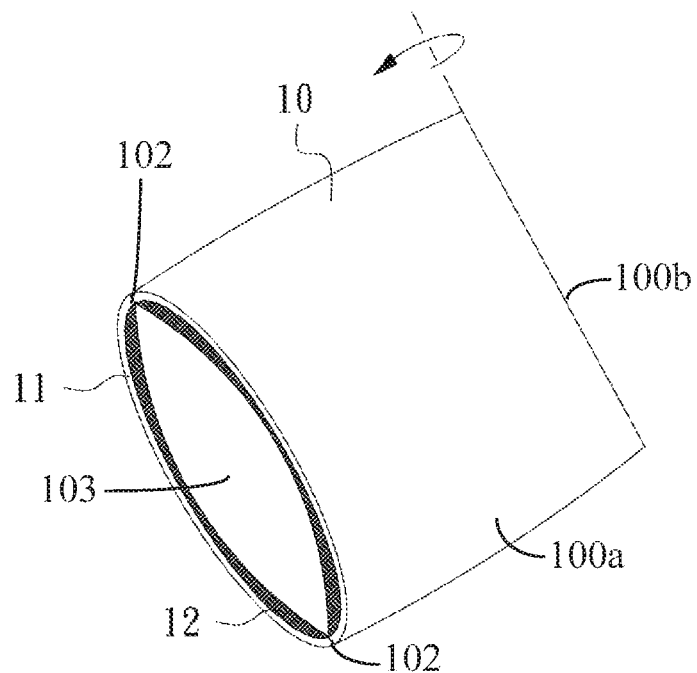
FIG. 12 & FIG. 13 are schematic views of a bag body by folding the planar structure of the present disclosure.
Figure 13:
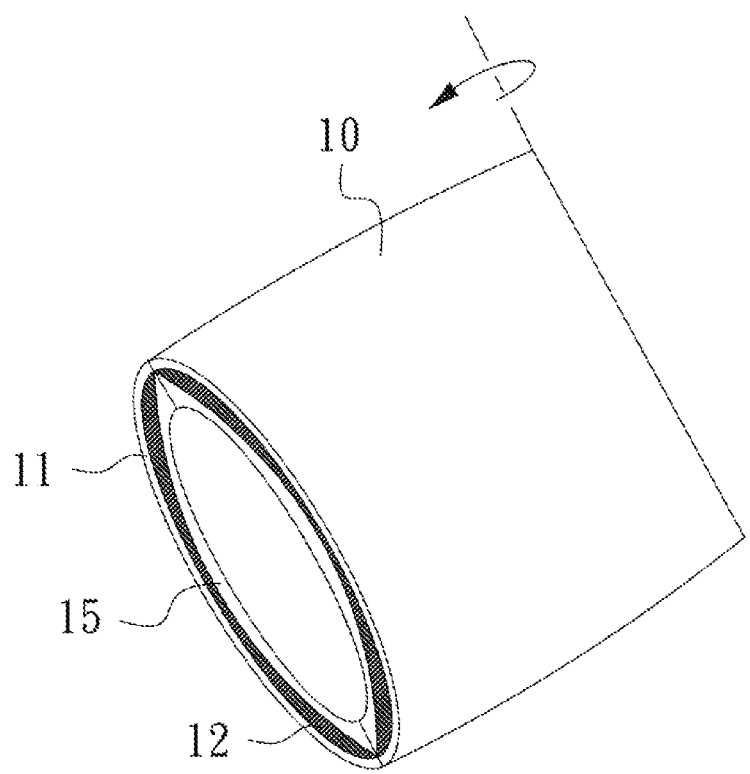

Referring to FIG. 12 and FIG. 13, another packaging structure 100 of the present disclosure is formed by the planar structure 10 after the planar structure 10 is folded with its two edges 102 being sealed, and the packaging structure 100 is a bag body 100a. At this time, the planar structure 10 includes an embodiment which includes the first surface 11 and the protecting layer 12, as well as another embodiment which includes the first surface 11, the protecting layer 12 and the second surface 15. Specifically, after the packaging structure 100 is formed by folding the planar structure 10, the two edges 102 of the packaging structure 100 perpendicular to a folding line 100b are adhered to each other, and an opening 103 is reserved on an opposite end parallel to the folding line 100b to form the bag body 100a, thereby the bag body 100a of the packaging structure 100 is formed. In this way, a product to be wrapped or a postal express product can be put into the bag body 100a through the opening 103. After the product is put into the bag body 100a, it can be surrounded by the protecting layer 12 to be protected.

Another embodiment of the present disclosure to form the packaging structure 100 includes: the planar structure 10 is cut into two pieces, and the two pieces of the planar structure 10 are overlapped to each other, and then their overlapped edges are sealed, and an opening 103 is reserved to form a bag body 100a. That is, only three sides of an overlapping part are applied glue together, and a rest side isn't sealed. An edge of the side opposite to the opening 103 can be folded and then glued to improve a bearing capacity of the bottom of the bag body 100a.

Figure 14:
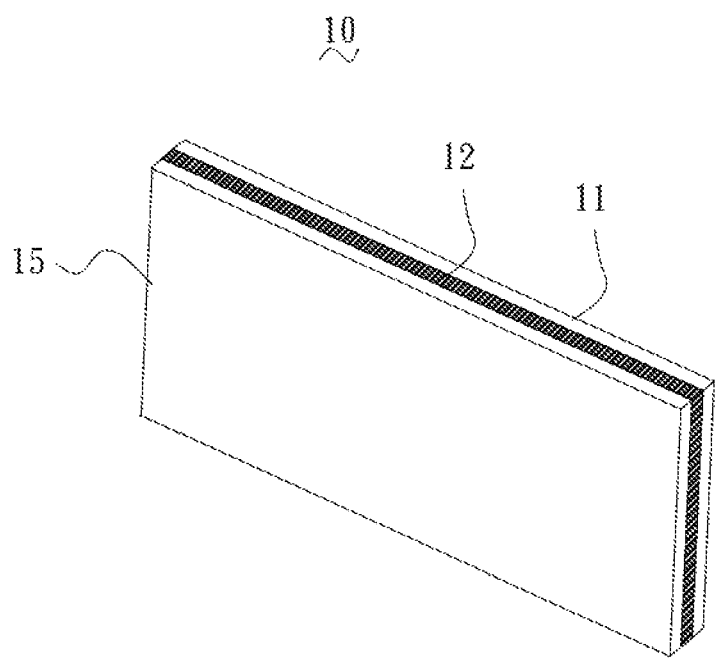
FIG. 14 is a schematic view of an overlapping way of the liner of the present disclosure.

Referring to FIG. 14, in an embodiment of the present disclosure, the protecting layer 12 is completely overlapped on the first surface 11, or the first surface 11 and the second surface 15. Referring to HG. 12 and FIG. 13, at this time, when the planar structure 10 is folded, after the two edges 102 of the bag body 100a are adhered to each other, an inner wall of the bag body 100a is arranged with the protecting layer 12 without a cover being provided on its opening position of the bag body 100a for sealing the bag body 100a.

Figure 15:
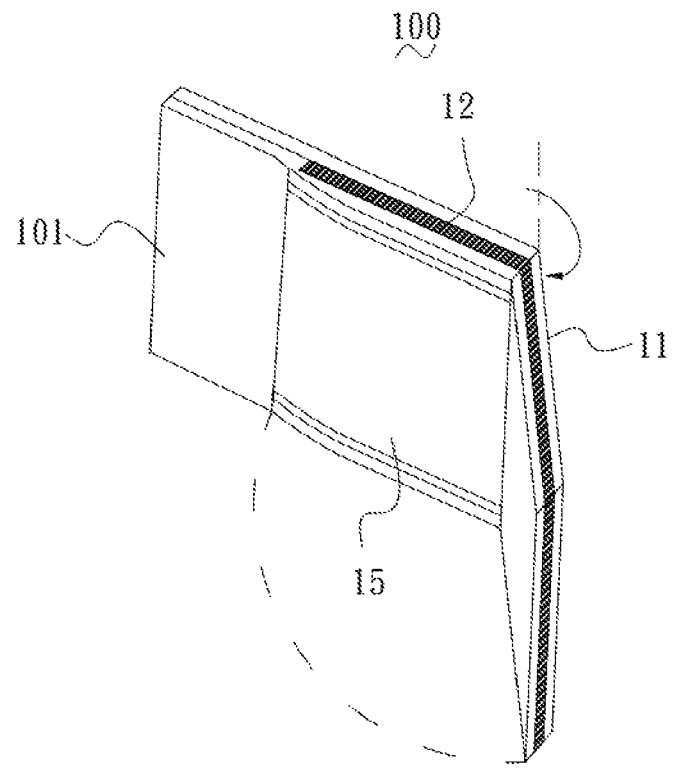
FIG. 15 is a schematic view of the bag body formed by the planar structure with different overlapping ways of liners.
Figure 16:
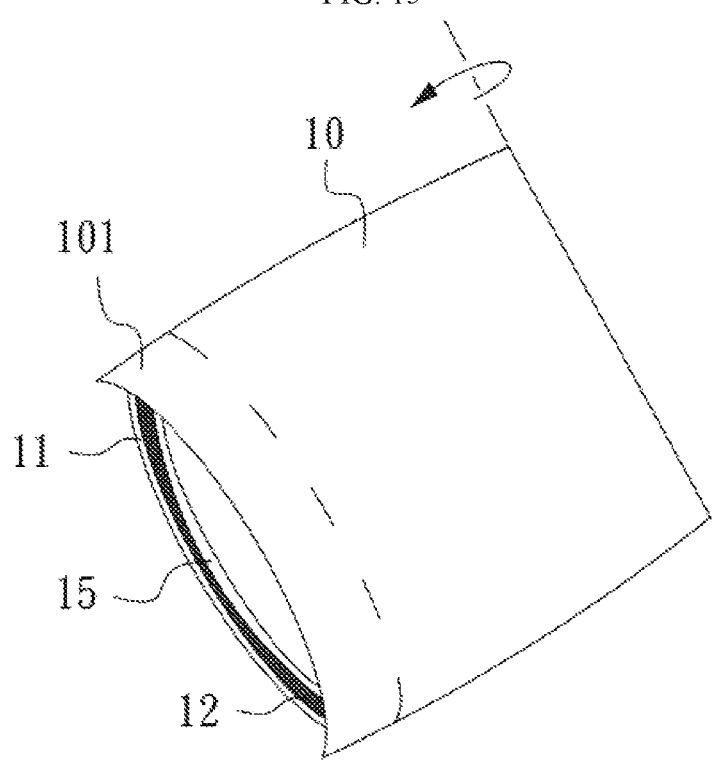
FIG. 16 is a schematic view of the bag body with a cover thereon of the present disclosure.

Referring to FIG. 15 and FIG. 16, in another embodiment of the present disclosure, the protecting layer 12 isn't completely overlapped on the first surface 11, or the first surface 11 and the second surface 15. A bare region 101 is reserved on the first surface 11 or on the first surface 11 and the second surface 15. At this time, when folding the planar structure 10, the bare region 101 is formed outside of an area to be folded, after the planar structure 10 is folded, the bare region 101 is acted as a cover for a newly formed bag body 100a to close the opening 103 of the bag body 100a.

In the above embodiments of the present disclosure, the first surface 11, the second surface 15 and the protecting layer 12 are all made of recyclable environmental protection materials.

Figure 17:
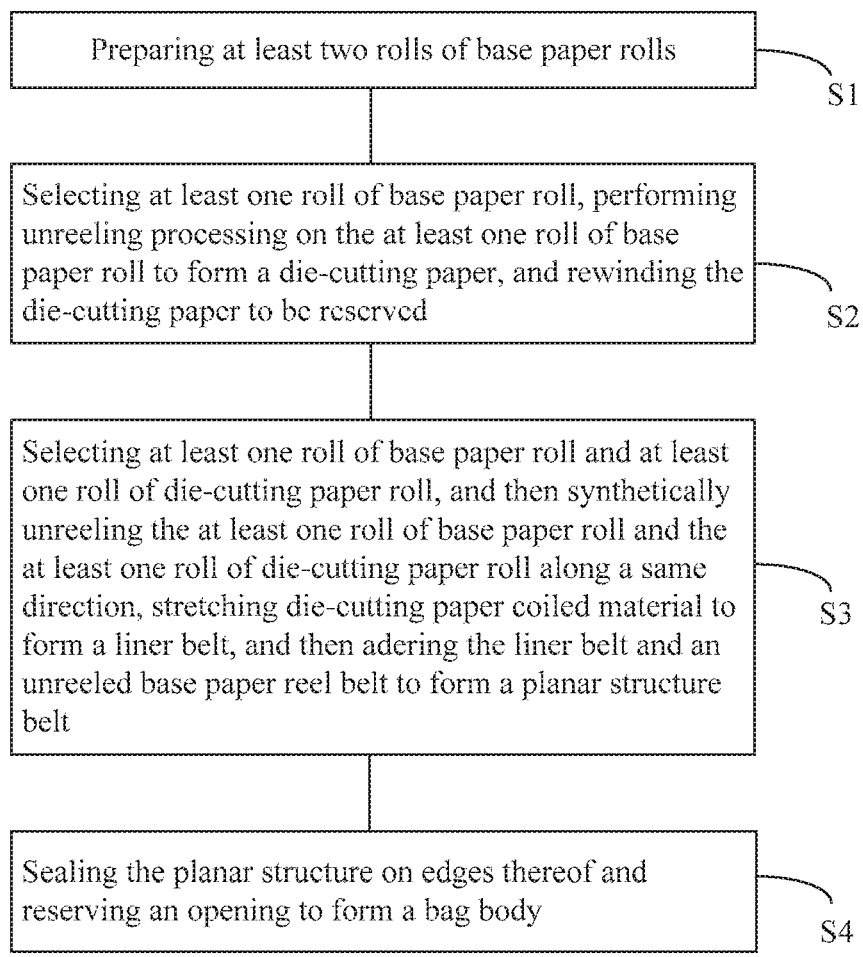
FIG. 17 is a flow chart of a manufacturing method of a packaging structure of the present disclosure.
Figure 18:
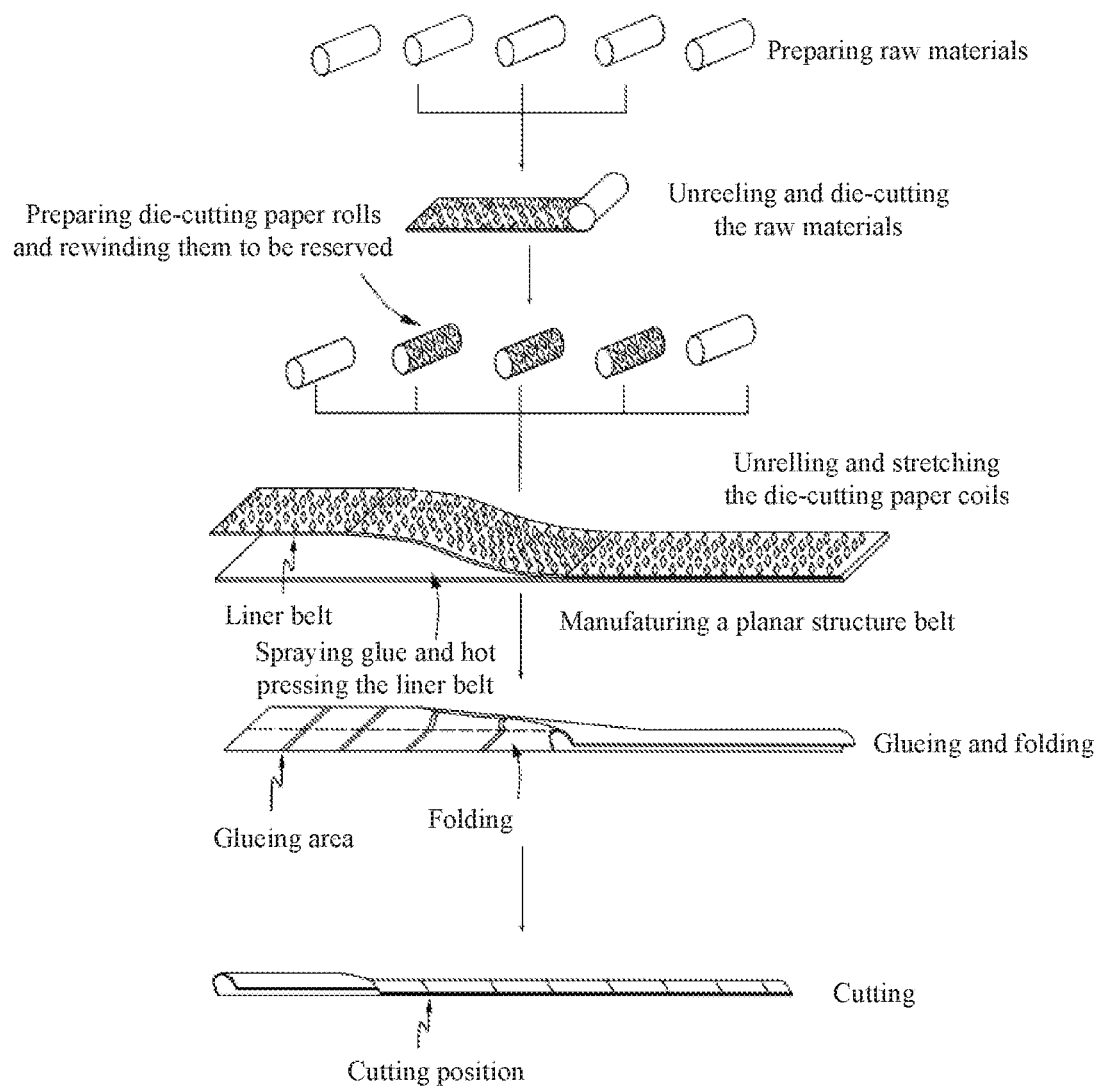
FIG. 18 is another flow chart of a manufacturing method of a packaging structure of the present disclosure.

Referring to FIG. 17 and FIG. 18, a manufacturing method of a full recycling environmental protection packaging structure 100 according to the present disclosure is provided. The manufacturing method includes: step S1, selecting at least two rolls of base paper rolls.

In the step S1, raw material prepared can include at least two rolls of base paper rolls, that is, the prepared raw material is roll materials. The material of the selected base paper roll can be same, or different according to different needs. That is, the material of the selected base paper roll needs to be recyclable environmental protection materials, such as recyclable, biodegradable environmental protection paper materials.

Step S2, selecting at least one roll of base paper roll, performing unreeling processing on the at least one roll of base paper roll to form a die-cutting paper, and rewinding the die-cutting paper to be reserved.

In the step S2, selecting one roll of base paper roll from preparation base paper rolls with paper material, the paper material of the selected base paper roll is exactly same as that of all base paper rolls so that it can be selected randomly. At this time, during manufacturing the packaging structure, preparation of materials can be more convenient and fast, and the prepared base paper roll can be mixed to use so that a material cost can be reduced.

Of course, the step S2, according to actual needs and characteristics of parcels and expresses, two kinds of base paper rolls with different paper materials can be prepared, the two kinds of paper rolls can be distinguished from each other, that is, an ordinary base paper roll is distinguished from a special base paper roll as a die-cutting paper. In this way, in this step, the base paper roll can only be selected from the special base paper roll which is marked.

Specifically, the step S2 further includes:

step S21, unreeling the base paper roll; in this step, the unreeling process is implemented by a rotating roll, and the base paper roll can be unreeled with the rotation of the rotating roll;

step S22, performing die-cutting processing on an unreeling part of the base paper roll to form a plurality rows of die-cutting lines, and each row of die-cutting lines includes a plurality of die-cutting knife lines arranged thereon at intervals after the each row of die-cutting lines is die-cut.

In the step S22, when the base paper roll is die-cut by using a die-cutting knife, the base paper roll is unreeled step-by-step, at every time, the base paper roll is unreeled for at least one length of the die-cutting knife, and then, the unreeled base paper roll is die-cut by e die-cutting knife; further, the base paper roll is again unreeled and die-cut again, until the base paper roll is unreeled and die-cut completely to form a die-cutting paper, and finally the die-cutting paper is rewound to be reserved.

After the unreeled base paper roll is all completed to be die-cut, a plurality rows of die-cutting lines is set parallel to each other, and a distance formed between every two adjacent die-cutting lines is same. Such die-cutting way with equal intervals, can reduce the difficulty of die-cutting process and the manufacturing cost.

In another embodiment of the present disclosure, a die-cutting distance between every two adjacent die-cutting lines can also be different according to different protection strengths. For example, when the planar structure is used for wrapping a fragile product such as glass, the fragile product needs to be surrounded by the planar structure again and again. A space between the die-cutting lines of the planar structure surrounding an inner side of the fragile product is less than a space between the die-cutting lines of the planar structure surrounding an outer side of the fragile product, in this way, it can reduce a number of die-cuttings as far as possible and reduce the cost under the conditions without reducing the protection strength premise.

After die-cutting the die-cutting knife line by a die-cutting knife or used as a die-cutting knife, the die-cutting paper is an indentation formed at a pre-set position of the die-cutting paper or a die-cutting wire for separating the die-cutting paper. The die-cutting knife line is intervally arranged on the die-cutting line, that is, the die-cutting knife line and a part without die-cutting parts are intervally and alternately arranged thereon. Similar intermittent lines are formed on the die-cutting paper so that the die-cutting knife line is a discontinuous part of the intermittent lines.

Step S3, selecting one roll of base paper roll and one roll of die-cutting paper roll and then synthetically unreeling the one roll of the base paper roll and the one roll of the die-cutting paper roll along a same direction, stretching a die-cutting paper coiled material to form a liner belt, and then overlapping the liner belt with an unreeled base paper reel belt to form a planar structure belt.

Specifically, when stretching coiled material of the die-cutting paper, the die-cutting paper roll is first unreeled, after being reeled, an unreeling speed at an unreeling end is different from that of an end far away from the unreeling end. The unreeling speed at the unreeling end is less than that of the end far away from the unreeling end. At this time, the die-cutting paper at the end far away from the unreeling end is stretched. In this way, a die-incision is formed by stretching the die-cutting knife line. The die-incision is a diamond-shaped configuration and formed by moving edges of the discontinuous part towards two sides of the die-incision. A network structure with multi-rows of diamond openings is formed after stretching the die-cutting paper, and is a soft-tissue structure to play as a protective role, and the network structure is configured to form a liner belt.

In the step S3, overlapping the liner belt with the base paper roll, includes several kinds of situations:

on one kind, an edge of the liner is jagged so that the liner can't be guaranteed to be completely flush with edges of a raw material belt acted as first and second surfaces of the planar structure, which is not suitable for an usage of glue. The way of glueing is difficult to ensure uniformity of the glue.

In the step S3, with a way of spraying and coating glue, the liner and both sides of a winding band are evenly sprayed the glue. It is also needed to be explained that the glue is resin glue. During pressing the liner, it is required to heat the raw material belt so that the resin glue can reach a temperature which is required for bonding the liner and the winding band. The resin glue does not have adhesive characteristics before it is hot pressed, so that the liner and the winding band can be sprayed the glue before working in the production line and folding the packaging structure, rather than worrying about that the glue can't be adhered in a later paste due to change its bonding properties.

In an embodiment of the present disclosure, the method of spraying the resin glue can ensure that the glue on the liner and both sides of the winding band is uniform, which is beneficial to improve a fixation strength of the packaging structure. At the same time, the liner and the winding band pressed together by the way of heating and pressing is conducive to fix the resin glue to further improve the fixation strength of the packaging structure.

On the other hand, the glue can be alternately sprayed at any position of the liner, rather than needing to spray along edges of the liner, but only to ensure that the liner can't fall off from the base paper roll. Such kind of optionally spraying glue way is adopted, except the position of spraying the glue, other liners are in soft states, thereby a stronger protect effect can be obtained.

In other embodiments of the present disclosure, the step S3 can also be: selecting one roll of base paper roll and at least two rolls of die-cutting paper rolls, stretching all die-cutting paper coiled materials to form a plurality of liner belts, and then overlapping the plurality of liner belts and an unreeled base paper roll to form a planar structure belt.

In an embodiment of the present disclosure, a plurality of rolls of die-cutting paper rolls is unreeled and arranged on a same side of one roll of base paper roll after being unreeled. The plurality of liner belts is superimposed together and then overlapped on the base paper roll. In the embodiment of the present disclosure, the number of the liner belt is increased, which can have a better protective effect after the planar structure is made. At the same time, in the production process of the packaging structure, it is only needed to increase the number of the unreeled die-cutting paper roll, thereby a low cost and a high efficiency can be obtained.

In other embodiments of the present disclosure, the step S3 can also be: selecting two rolls of base paper rolls and at least one roll of die-cutting paper roll, stretching all die-cutting paper coiled materials to form a plurality of liner belts, the plurality of liner belts located between two roll of base paper coiled materials after being unreeled, and then overlapping the plurality of liner belts and two base paper rolls to form a planar structure belt.

In the step S3, the formed planar structure belt includes a first surface, a second surface and a protecting layer with at least one layer liner clamped between the first surface and the second surface, which is more solid, with better shock absorption effect and a lower process cost to add another layer of base paper rolls. Of course, the protecting layer clamped between the first and second surfaces can also include a plurality layers of liners.

Referring to FIG. 17 and FIG. 18, The manufacturing method of the present disclosure also includes a method for forming a bag body by the planar structure, that is, step S4:

sealing the planar structure on edges thereof and reserving an opening to form the bag body.

Specifically, two edges of the packaging structure perpendicular to a folding line are adhered to each other after the packaging structure is folded by a piece of planar structure, and an opening is reserved on an opposite end parallel to the folding line to form the bag body; in the step S4, the planar structure has one side feed, at the same time, the planar structure is alternately glued along its vertical feed direction, a glueing position is a folded and pressed position after the planar structure is cut, and two adjacent glueing positions are both sides of the planar structure after the planar structure is cut. After folding and pressing the planar structure, the glueing position is cemented, and then the bag body is formed.

In an embodiment of the present disclosure, the liner belt is completely overlapped on the base paper reel belt, when the planar structure is folded, a folding line is located on a center line along the length of the liner belt, the liner belt is covered on an inner wall of the folded bag body, and the bag body is not provided with a structure for sealing the opening.

The packaging structure can be superimposed by two pieces of planar structures and sealed at overlapping edges thereof, and an opening is reserved to form the bag body. Specifically, the planar structure is cut into two pieces, and the two pieces of the planar structure are overlapped to each other, and then their overlapped edges are sealed, and an opening is reserved to form the bag body. That is, only three sides of an overlapping part are adhered together, and a rest side isn't sealed. An edge of the side opposite to the opening can be folded and then glued to improve a bearing capacity of the bottom of the bag body.

In another embodiment of the present disclosure, the liner belt isn't completely overlapped on the base paper reel belt, and the base paper reel belt is reserved with a bare region 101 on an edge extending along the length of the base paper reel belt. The planar structure belt is folded along the length direction of the liner belt when it is folded. The bare region 101 is corresponding to the opening 103 after the bag body 100a is formed by the planar structure. The bare region 101 is configured to seal a mouth of the bag body 100a.

Furthermore, an inner side of a sealing cover is coated with a sealing adhesive and covered with a release paper. When using the planar structure, the sealing cover can be folded and sealed directly at the mouth of the bag body 100a by tearing off the release paper.

In the manufacturing method of the present disclosure, the liner belt used for a protecting layer and the base paper roll are made of recycling environmental protection material materials, and the protecting layer is acted as a buffer by using the liner, which can solve technical problems of dust pollution and poor air quality caused by using powdery and granular soft structures used as buffer materials in the prior art. Furthermore, a multi-layer liner used as the buffer can also achieve a same buffer effect of a conventional plastic board or a conventional plastic foam as buffer materials, so as to prevent internal articles received in the packaging structure from being damaged. In addition, during manufacturing the packaging structure of the present disclosure, a whole raw material production, including the production of the liner belt, is completed in a delivering process of a paper roll. In this way, in the process of multi-layer overlapping, folding, cementing and die-cutting, conveyor belts have been in a state of delivery, thereby a higher production efficiency can be obtained.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A full recycling environmental protection packaging structure having a planar structure of paper, the planar structure comprising:
   a first surface and a protecting layer overlapped on the first surface;
   the protecting layer comprising multi-layers of liners which are superimposed to form the protective layer with a three-dimensional network structure being formed by paper material being stretched after the paper material is die-cut; wherein
   the liner is formed by stretching a die-cutting paper, and a plurality of rows of die-cutting lines is formed by die-cutting the die-cutting paper; each row of die-cutting lines comprising a plurality of die-cutting knife lines arranged thereon at intervals after the each row of die-cutting lines is die-cut, so that a die-incision is formed by stretching the die-cutting knife line; and wherein
   the packaging structure is sealed so as to form a bag body having an opening; and wherein
   the planar structure comprises a second surface so that the protecting layer is clamped between the first surface and the second surface; and wherein
   the multi-layers of liners are overlapped by a horizontal and vertical overlapping way that a layout of one row of die-incisions in one layer of liners is perpendicular to a layout of the die-incisions in the other layer of liners, so that positions of the die-incisions after overlapping the multi-layers of liners isn't completely coincide with each other; and wherein
   the plurality of die-cutting lines arranged at intervals is straight lines or arc lines parallel to each other, and a distance between every two adjacent die-cutting lines is different so that the space between the two adjacent die-cutting lines of the planar structure surrounding an inner side of a fragile product is less than the space between the two adjacent die-cutting lines of the planar structure surrounding an outer side of the fragile product when the fragile product is surrounded by the planar structure.

2. The full recycling environmental protection packaging structure as claimed in claim 1, wherein the protecting layer isn't completely overlapped on the first surface and/or the second surface, and a bare region is reserved on the first surface and/or the second surface, the bare region opposite to the opening.

3. The full recycling environmental protection packaging structure as claimed in claim 1, wherein two edges of the packaging structure perpendicular to a folding line are adhered to each other after the packaging structure is folded by a piece of planar structure, and the opening is reserved on an opposite end parallel to the folding line to form the bag body; or
   the packaging structure is superimposed by two pieces of planar structures and sealed at overlapping edges thereof so as to form the bag body having the opening.

4. The full recycling environmental protection packaging structure as claimed in claim 1, wherein the plurality of die-cutting lines arranged at intervals is straight lines or arc lines parallel to each other, and a distance between every two adjacent die-cutting lines is same.

5. The full recycling environmental protection packaging structure as claimed in claim 1, wherein the die-cutting knife line and parts without being die-cut are intervally and alternately arranged thereon and similar intermittent lines are formed on the die-cutting paper so that the die-cutting knife line is a discontinuous part of the intermittent lines; the die-incision is a diamond-shaped configuration and formed by moving edges of the discontinuous part towards two sides thereof, and the three-dimensional network structure comprises multi-rows of diamond openings formed thereon after the die-cutting paper is stretched.

6. The full recycling environmental protection packaging structure as claimed in claim 1, wherein positions of the die-incisions after overlapping the multi-layers of liners are not completely coincided with each other.

7. A full recycling environmental protection packaging structure having a planar structure of paper, the planar structure comprising:
- a first surface and a second surface opposite to the first surface;
- a protecting layer clamped between the first surface and the second surface;
- the protecting layer comprising multi-layers of liners which are superimposed to form the protective layer with a three-dimensional network structure being formed by paper material being stretched after the paper material is die-cut; and wherein
- the packaging structure is sealed so as to form a bag body having an opening; and wherein
- the multi-layers of liners are overlapped by a cross overlapping way that an angle is formed between a layout of one row of die-incisions in one layer of liners and a layout of the die-incisions in the other layer of liners, so that positions of the die-incisions after overlapping the multi-layers of liners isn't completely coincide with each other; and wherein
- the plurality of die-cutting lines arranged at intervals is straight lines or arc lines parallel to each other, and a distance between every two adjacent die-cutting lines is different so that the space between the two adjacent die-cutting lines of the planar structure surrounding an inner side of a fragile product is less than the space between the two adjacent die-cutting lines of the planar structure surrounding an outer side of the fragile product when the fragile product is surrounded by the planar structure.

8. The full recycling environmental protection packaging structure as claimed in claim 7, wherein the protecting layer comprises multi-layers of liners which are superimposed to form the protective layer.

9. The full recycling environmental protection packaging structure as claimed in claim 8, wherein the protecting layer isn't completely overlapped on the first surface and/or the second surface, and a bare region is reserved on the first surface and/or the second surface, the bare region opposite to the opening; two edges of the packaging structure perpendicular to a folding line are adhered to each other after the packaging structure is folded by a piece of planar structure, and the opening is reserved on an opposite end parallel to the folding line to form the bag body; or
the packaging structure is superimposed by two pieces of planar structures and sealed at overlapping edges thereof so as to form the bag body having the opening.

10. The full recycling environmental protection packaging structure as claimed in claim 9, wherein the die-cutting knife line and parts without being die-cut are intervally and alternately arranged thereon and similar intermittent lines are formed on the die-cutting paper so that the die-cutting knife line is a discontinuous part of the intermittent lines; the die-incision is a diamond-shaped configuration and formed by moving edges of the discontinuous part towards two sides thereof, and the three-dimensional network structure comprises multi-rows of diamond openings formed thereon after the die-cutting paper is stretched.

11. The full recycling environmental protection packaging structure as claimed in claim 9, wherein the bare region is formed outside of an area to be folded when folding the planar structure, and the bare region is acted as a cover for the bag body to close the opening of the bag body after the planar structure is folded.

12. The full recycling environmental protection packaging structure as claimed in claim 7, wherein a plurality of rows of die-cutting lines is formed by die-cutting a die-cutting paper; each row of die-cutting lines comprising a plurality of die-cutting knife lines arranged thereon at intervals after the each row of die-cutting lines is die-cut, a die-incision formed by stretching the die-cutting knife line.

13. The full recycling environmental protection packaging structure as claimed in claim 12, wherein the plurality of die-cutting lines arranged at intervals is straight lines or arc lines parallel to each other with a same distance between every two adjacent die-cutting lines, and the die-cutting knife line is an indentation formed at a pre-set position of the die-cutting paper or a cutter point for separating the die-cutting paper.

14. The full recycling environmental protection packaging structure as claimed in claim 12, wherein positions of the die-incisions after overlapping the multi-layers of liners are not completely coincided with each other.

* * * * *